(12) United States Patent
Rodriguez

(10) Patent No.: US 8,118,260 B2
(45) Date of Patent: Feb. 21, 2012

(54) FITTING FOR TRIMMING A HORIZONTAL STABILIZER OF AN AIRCRAFT

(75) Inventor: Elena Arevalo Rodriguez, Madrid (ES)

(73) Assignee: Airbus Operations S.L., Madrid (ES)

( * ) Notice: Subject to any disclaimer, the term of this patent is extended or adjusted under 35 U.S.C. 154(b) by 386 days.

(21) Appl. No.: 12/424,811

(22) Filed: Apr. 16, 2009

(65) Prior Publication Data
US 2010/0108803 A1 May 6, 2010

(30) Foreign Application Priority Data
Oct. 31, 2008 (ES) .................................. 200803103

(51) Int. Cl.
*B64C 1/06* (2006.01)
(52) U.S. Cl. .................. 244/131; 244/117 R; 244/129.1
(58) Field of Classification Search ................. 244/99.2, 244/99.3, 117 R, 129.1, 131, 178
See application file for complete search history.

(56) References Cited

U.S. PATENT DOCUMENTS

| | | | | |
|---|---|---|---|---|
| 2,378,885 | A * | 6/1945 | Watter | 244/117 R |
| 2,892,601 | A * | 6/1959 | Hawkins et al. | 244/190 |
| 3,594,851 | A * | 7/1971 | Swatton | 16/276 |
| 4,159,604 | A * | 7/1979 | Burrell | 52/376 |
| 6,270,039 | B1 * | 8/2001 | Linjama | 244/213 |
| 6,530,544 | B2 * | 3/2003 | Milliere | 244/213 |
| 6,786,452 | B2 * | 9/2004 | Yamashita et al. | 244/123.1 |
| 6,802,475 | B2 * | 10/2004 | Davies et al. | 244/99.2 |
| 7,541,083 | B2 * | 6/2009 | Grose et al. | 428/119 |
| 7,604,200 | B2 * | 10/2009 | Garcia Laja | 244/99.3 |
| 7,770,844 | B2 * | 8/2010 | Chrissos et al. | 244/118.1 |
| 2002/0125369 | A1 * | 9/2002 | Milliere | 244/75 R |
| 2008/0001029 | A1 * | 1/2008 | Garcia Laja | 244/99.3 |
| 2008/0164375 | A1 * | 7/2008 | Garcia Laja et al. | 244/131 |
| 2008/0295334 | A1 * | 12/2008 | Kulesha | 29/897.2 |
| 2009/0218446 | A1 * | 9/2009 | McAlinden et al. | 244/131 |
| 2009/0283639 | A1 * | 11/2009 | Ackermann et al. | 244/131 |
| 2009/0321575 | A1 * | 12/2009 | Barroso Vloedgraven et al. | 244/131 |
| 2010/0127127 | A1 * | 5/2010 | Manzano | 244/131 |
| 2010/0264263 | A1 * | 10/2010 | Shaheen et al. | 244/99.3 |

* cited by examiner

*Primary Examiner* — Benjamin P. Lee
*Assistant Examiner* — Joshua Freeman
(74) *Attorney, Agent, or Firm* — Oblon, Spivak, McClelland, Maier & Neustadt, L.L.P.

(57) ABSTRACT

A fitting for trimming the horizontal stabilizer of an aircraft, made of composite material, the fitting including side walls of a torsion box as well as joining elements which join the fitting to the frames of the tail fuselage of the aircraft, the side walls being joined together by a central element which includes a first end part joined to the first side wall of the fitting, a second end part joined to the second side wall of the fitting and a central part which joins together the end parts, the fitting includes end elements which are joined to the side walls on their outer face, the fitting having, owing to its greater rigidity in response to side load and vertical load stresses which tend to close the side walls, its greater integration and the simplicity of the load path, an optimum structural behavior in response to the aircraft stresses.

13 Claims, 3 Drawing Sheets

FITTING FOR TRIMMING A HORIZONTAL STABILIZER OF AN AIRCRAFT

FIELD OF THE INVENTION

The present invention relates to a fitting for trimming a horizontal stabilizer of an aircraft.

PRIOR ART

Usually the assembly of a trimmable horizontal stabilizer in an aircraft is performed by coupling the said stabilizer to the aircraft by means of one or two pivoting points and a control point. To allow trimming of the plane in which the horizontal stabilizer is situated, the control point must be able to change its position vertically so as to allow the stabilizer to pivot on the pivoting point or points. In order to allow the said change in position of the control point, it is usual to provide a motor/spindle unit fixed by means of a fitting so that rotation of the said spindle in one direction or the other causes the upward or downward movement of the control point.

The fitting which fixes the spindle of the above motor/spindle unit is a metal fitting which is usually joined to a torsion box, said torsion box in turn being joined to two load frames of the aircraft. The motor which drives the spindle is fixed in the fitting, while the spindle, which is connected to the motor via a ball and socket joint, pivots relative to the fitting so that the sum of moments at the control point of the horizontal stabilizer is zero, the load being practically a pure vertical load.

Typically the metallic fitting comprises a primary fastening element and a secondary fastening element in order to be able to fulfil the fail-safe requirements of an aircraft, so that, in case of failure of the primary fastening element, the secondary element is able to support the resultant load without consequently endangering the integrity of the aircraft. The primary fastening element usually has female lugs, while the secondary fastening element has male or female lugs.

In spite of the trends in recent years to introduce the use of composite materials or "composites" such as CFRP (Carbon Fibre Reinforced Plastic) in as many components of an aircraft as possible owing to the saving in weight implied by this material compared to aluminium (the metal material which is most used), the majority of aircraft manufacturers are reluctant to use carbon fibre for fittings since the complexity of these fittings leads to an expensive manufacturing. This complexity is particularly pronounced in the case of the fitting of the motor/spindle unit for trimming a horizontal stabilizer of an aircraft, due to the relatively large number of lugs which it must have and the arrangement of said lugs.

It is therefore desirable to be able to have a fitting for a motor/spindle unit for trimming a horizontal stabilizer of an aircraft which overcomes the abovementioned drawbacks and which, therefore, can be made of a composite material in a simple and low-cost manner.

The document US 2008/0001029 A1 describes a fitting, the walls of which form part of a torsion box made of a composite material, said fitting being intended to be coupled to the motor/spindle assembly for trimming a horizontal stabilizer of an aircraft. The fitting according to US 2008/0001029 A1 comprises two side walls which form a torsion box and joining means for joining said walls to two frames of the tail fuselage of the aircraft, as well as a primary fastening element for coupling a pivoting motor/spindle unit, and a secondary fastening element. Moreover, the side walls of the torsion box are joined together by means of a central element which forms the secondary fastening element, arranged between said walls.

The problem posed by the fitting of the motor/spindle unit for a horizontal stabilizer according to US 2008/0001029 A1 is that it has a very complex geometrical form, in particular as regards its central element, so that manufacturing thereof is difficult and costly, requiring moreover additional parts in order to stabilize the fitting and achieve an adequate behaviour in response to a load.

The present invention aims to solve the abovementioned drawbacks.

SUMMARY OF THE INVENTION

Thus the present invention relates to a fitting made of composite material, i.e. a carbon-fibre reinforced plastic, for the spindle of the motor/spindle unit, said spindle varying the height of the fastening point of the horizontal stabilizer of an aircraft so that it allows trimming of said stabilizer with respect to the tail fuselage of the aircraft on which the said stabilizer is arranged.

The fitting according to the invention comprises two side walls which form part of a torsion box and joining means for joining said side walls to two frames of the tail fuselage of the aircraft. The two side walls of the torsion box of the fitting according to the invention have a U-shaped cross section so that they are able to be joined to the skin of the tail fuselage without the need for additional parts.

The fitting according to the invention comprises in turn a primary fastening element and a secondary fastening element so as to be able to meet the fail-safe requirements of the aircraft.

In accordance with the invention the primary fastening element is composed of the abovementioned torsion box side walls and by another two end elements which are joined to said side walls, one end element being joined to the first side wall and the other end element being joined to the second side wall. Each end element in turn comprises first sections which extend parallel to the side walls, second sections which extend respectively from one of the first sections towards the corresponding side wall, and third sections each arranged against and joined to the corresponding side wall, the said two end elements thus forming an omega-shaped cross section.

The first sections of the two end elements comprise respective first primary through-holes, while the side walls of the torsion box comprise respective second primary through-holes which are aligned with the first primary through-holes, thus forming the primary fastening element.

The secondary fastening element of the fitting according to the invention is formed by a central element, with an I-shaped cross section, said element also comprising in its central part secondary through-holes. This geometrical form of the secondary joint with the U-shaped cross section of the side walls improves the behaviour of the fitting in response to a lateral load since the said I-shaped cross section provides a better support for the side walls which form the torsion box of the fitting and since the U-shaped cross section provides a direct joint to the skin of said walls. Moreover, the geometrical form of the fitting is simpler and easier to manufacture than that of the fittings known according to the state of the art (mainly as regards the central element thereof).

In accordance with the invention, the said sections of each end element could comprise an additional laminate which is preferably made of the same material as the rest of the fitting element, so that the said laminate has a cross section which replicates said sections, so constituting the said omega configuration. Said laminate could be formed by means of additional layers on top of the end element, so that it forms a single piece therewith.

The aforementioned structure allows the walls of the torsion box, the central element and the end elements of the fitting to be formed from carbon-fibre reinforced plastic, i.e. composite material, and at the same time allows optimum distribution of the loads which act on the above unit. Thus the loads applied to the fitting are essentially loads in the vertical direction, although the said fitting is also subject to small longitudinal loads due to trimming of the horizontal stabilizer and a small lateral load component. The additional laminate, which replicates the geometrical form of the end element of the fitting, prevents the possible problems of de-bonding of the third sections of the end elements and the side walls of the torsion box are reduced, in the case where the joint between the two consists of a bonded joint.

Both the vertical loads of the primary fastening as well as the longitudinal loads are applied to the primary through-holes (to the lugs situated both in the end elements and in the walls of the torsion box). These loads are transmitted to the walls of the torsion box by means of joints which are provided in the respective third sections of the end elements and are then converted into shear flows in the web of the frames to which said walls are joined. The joints between the third sections and the side walls could be riveted joints or bonded joints. In the fail-safe condition, where the loads are applied to the secondary fastening, these loads are transferred to the walls of the torsion box also via riveted or bonded joints.

In order to manufacture the fitting with torsion box according to the present invention, it is possible to use techniques which are conventional per se and which allow shaping of the parts and, in case of riveted joints being envisaged, allow riveting of said parts. Thus, the foreseen parts can be obtained by means of automatic processes (in pre-peg with ATL and hot-forming) or could be manufactured for example by means of Resin Transfer Moulding (RTM) processes. In both cases the parts could be manufactured separately and then riveted or bonded together, or could be manufactured as a single integrated part.

The fitting with torsion box according to the present invention is easy and cheap to manufacture and is less heavy than the metal designs owing to its greater integration and the simplicity of the load path, thus fulfilling the aim specified previously.

Other characteristic features and advantages of the present invention will emerge from the detailed description which follows of an embodiment illustrating the subject thereof with reference to the accompanying figures.

DETAILED DESCRIPTION OF THE INVENTION

Figure 1:
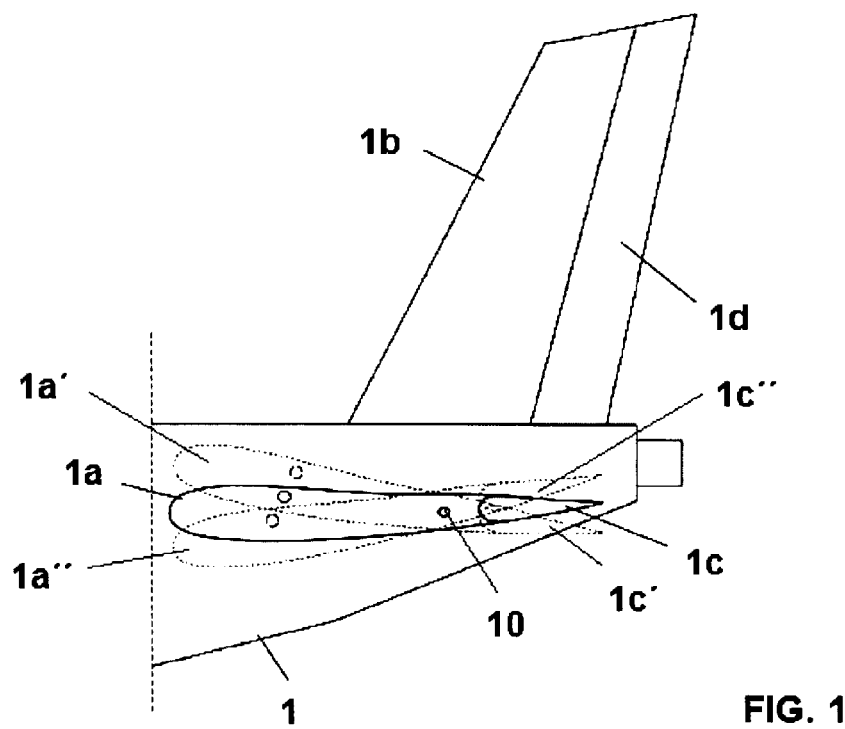
FIG. 1 is a schematic side elevation view of the tail fuselage and empennage of an aircraft.
Figure 2:
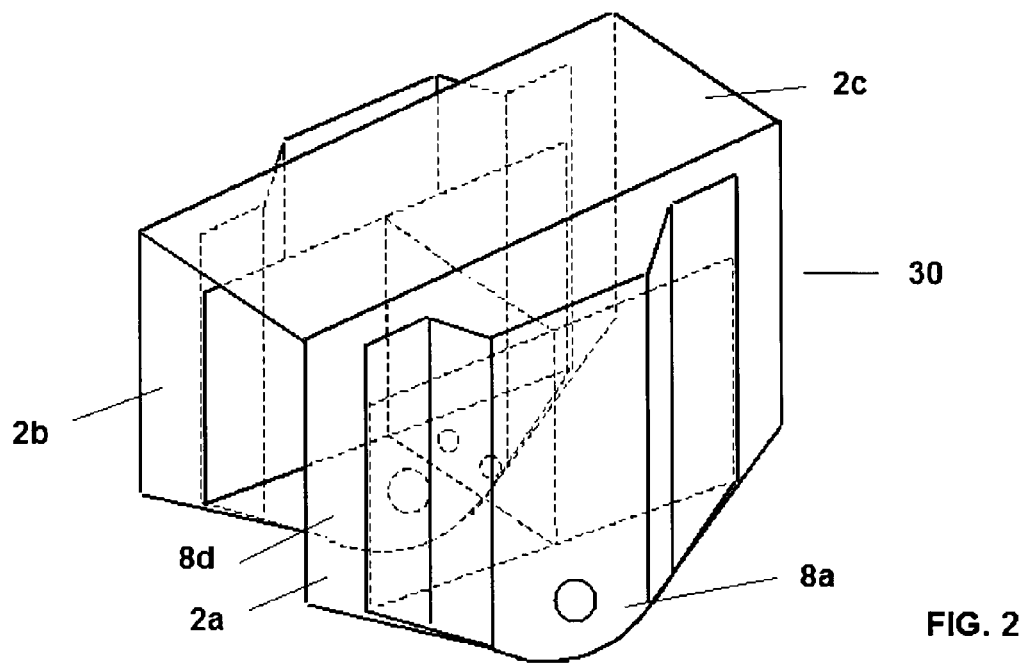
FIG. 2 is a schematic perspective view of the fitting with torsion box for trimming a horizontal stabilizer of an aircraft according to the present invention.
Figure 3:
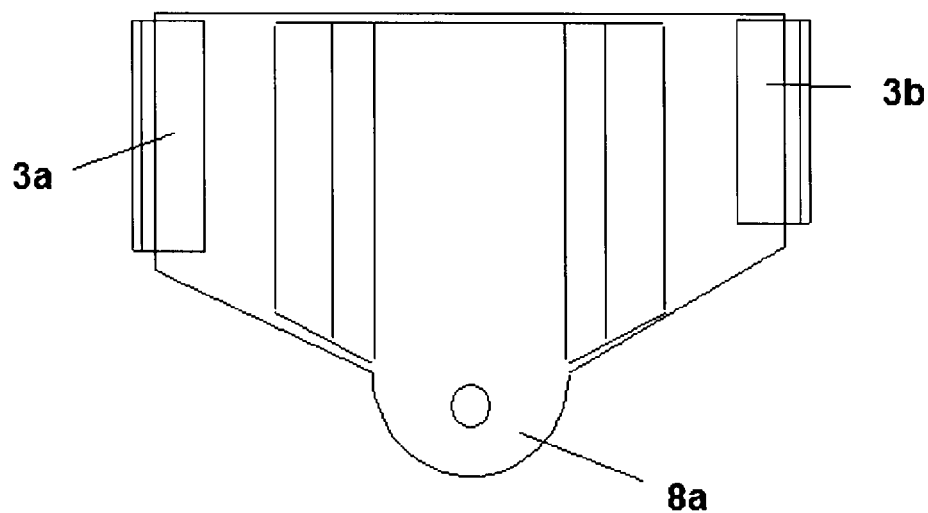
FIG. 3 is a schematic side elevation view of an embodiment of the fitting with torsion box according to the invention shown in FIG. 2, including the elements for joining to the load frames.

FIG. 1 shows the tail fuselage 1 of an aircraft, on which a horizontal stabilizer 1a with its elevator 1c as well as a vertical stabilizer 1b with its rudder 1d are arranged. The horizontal stabilizer 1a can be trimmed in a conventional manner by means of a motor/spindle mechanism which is connected to a control point 10, actuation of which causes the horizontal stabilizer 1a to pivot so that, also in a conventional manner, the horizontal stabilizer 1a and the elevator 1c are able to adopt the positions 1a', 1c' and 1a'', 1c'', respectively, as shown in the said FIG. 1.

Figure 4:
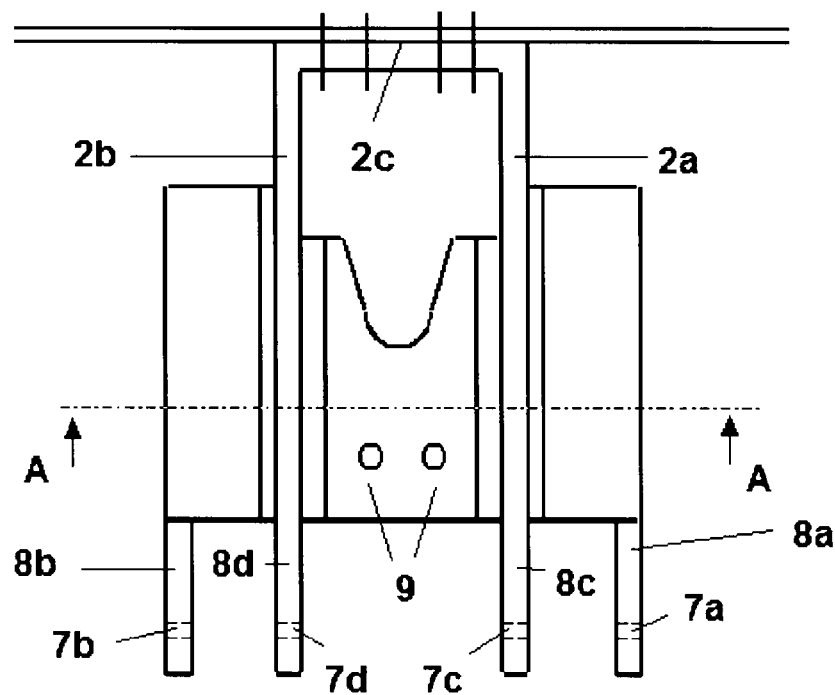
FIG. 4 is a schematic front perspective view of the fitting with torsion box according to the invention shown in FIG. 2, showing also joining of the fitting to the skin.

FIGS. 2 to 6 show a preferred embodiment of the fitting 30 according to the invention for trimming a horizontal stabilizer 1a, said fitting 30 comprising the side walls 2a and 2b of a torsion box. Said fitting 30 comprises first joining means 3a in the form of angle pieces so that the walls 2a and 2b can be riveted to a first frame (not shown in the figures) of the tail fuselage 1 of the aircraft. The fitting 30 comprises moreover second joining means 3b, also in the form of angle pieces, so that the side walls 2a and 2b can be riveted to a second frame of the tail fuselage 1. The elements 3a or 3b could be incorporated in the corresponding side walls 2a or 2b without the need of additional parts. The side walls 2a, 2b could be joined together by means of an upper section 2c so that the cross section of the fitting part, made up of the joining together of 2a+2b+2c, is U-Shape which allows the said side walls 2a, 2b to be joined directly to the skin of the tail fuselage 1 by means of the upper section 2c (FIG. 4).

On the other hand, the side walls 2a, 2b are joined together by means of a central element 4 arranged between said side walls 2a, 2b. If necessary, on each side of the central element 4, each wall 2a or 2b could have swaggered zones intended to prevent buckling of said walls 2a, 2b. The central element 4 comprises a first end part 4a joined to the first wall 2a, a second end part 4b joined to the second side wall 2b of the torsion box, and a central part 4c which joins together said end parts 4a, 4b. End elements 5a, 5b are joined to the side walls 2a, 2b. Both the side walls 2a and 2b of the torsion box, as well as the section 2c, and the end elements 5a and 5b, the central element 4 and the joining means 3a and 3b could be made of carbon-fibre reinforced plastic.

Each end element 5a, 5b comprises respective first sections 5d, 5e which extend parallel to the side walls 2a, 2b, respective second sections 5f, 5g which extend respectively from one of the first sections 5d, 5e towards the corresponding side wall 2a, 2b, and respective third sections 5h, 5i each one joined to the corresponding side wall, 2a, 2b. It can be seen that the sections 5d, 5f, 5h and 5e, 5g, 5i, which respectively form the end elements 5a and 5b, have an overall omega-shaped cross section, it being possible to arrange above these sections 5d, 5e, 5f, 5g, 5h, 5i a laminate 6 which has an omega-shaped cross section similar to that of said sections and which may be obtained by adding an additional CFRP laminate so that the latter forms a single piece with each end element 5a, 5b. The respective third sections 5h, 5i and the parts of the additional laminates 6, on both sides of 5a and 5b, are joined to the corresponding side wall 2a, 2b by means of rivets or by means of a bonded joint.

The first sections 5d, 5e of the end elements 5a, 5b include respective first primary through-holes 7a, 7b while the side walls 2a, 2b comprise second primary through-holes 7c, 7d (FIG. 4). These primary through-holes 7a, 7b, 7c and 7d are aligned and respectively located in primary lugs 8a, 8b, 8c and 8d which emerge from the respective bottom edges of the first sections 5d, 5e of the end elements 5a, 5b and the respective bottom edges of the walls 2a, 2b so as to thus form the primary fastening.

Said lugs 8a, 8b, 8c, 8d could be reinforced with zones of greater thickness or zones provided with a hybrid titanium-CFRP laminate.

In turn, the central element 4 comprises a zone with two secondary through-holes 9, which form the secondary fastening of the fitting according to the invention, which zone may also be reinforced with a greater thickness or with a hybrid titanium-CFRP laminate.

Both the third sections 5h, 5i of the end elements 5a, 5b and the central element 4 be joined to the respective walls 2a, 2b by means of bonding or riveting, although the central element 4, the walls 2a, 2b, 2c, the elements 3a and 3b and the end elements 5a, 5b also be a single-piece part.

Figure 5:
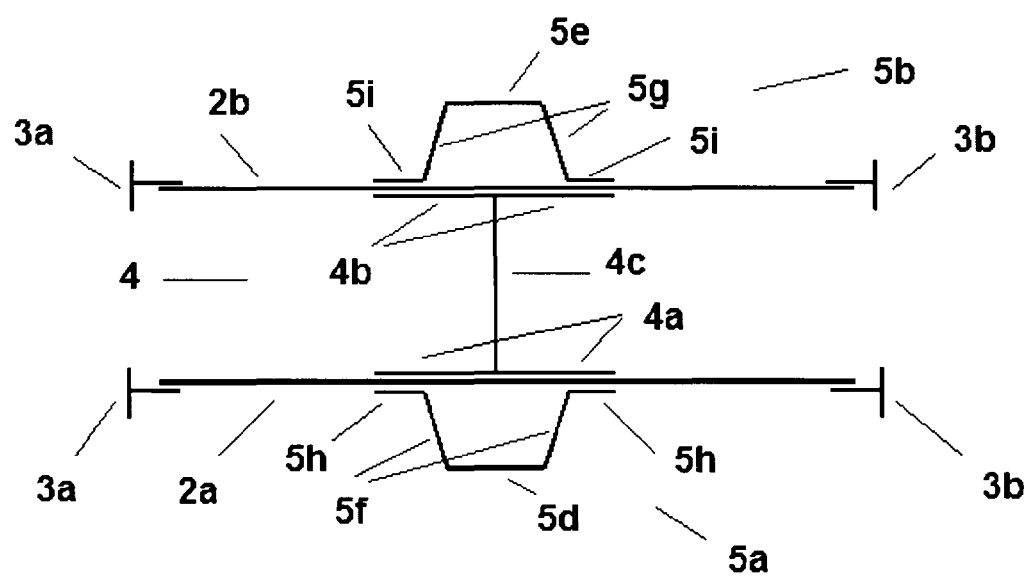
FIG. 5 is a schematic plan view of the fitting with torsion box according to the invention shown in FIG. 2, along the section A-A of FIG. 4.

Thus, the fitting made of composite material according to the present invention, for trimming the horizontal stabilizer of an aircraft 1a comprises, as essential elements, side walls 2a, 2b, said side walls, 2a and 2b, being joined together by means of a central element 4 which comprises a first end part 4a joined to the first wall 2a, a second end part 4b joined to the second wall 2b, and a central part 4c which joins together said end parts 4a, 4b (FIG. 5). Said fitting comprises moreover end elements, 5a and 5b, which are preferably omega-shaped (although they may also have I-shaped or other cross sections) and which are joined to the side walls, 2a and 2b (FIG. 5). These end elements, 5a and 5b, are located outside the side walls, 2a and 2b, as can be seen in FIG. 5.

Figure 6:
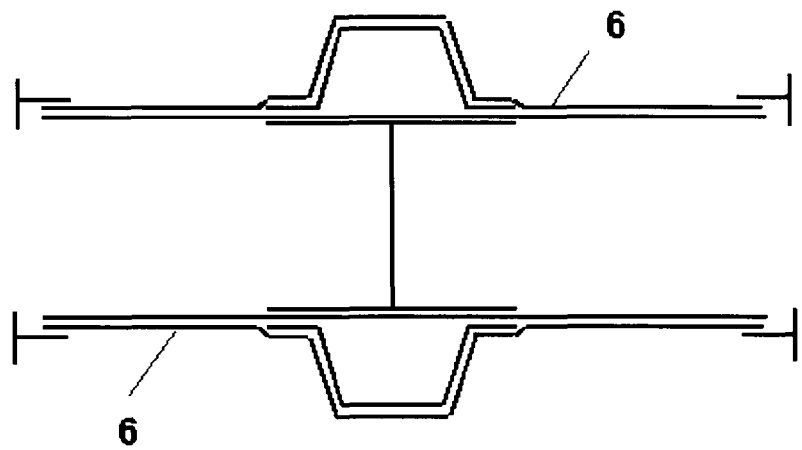
FIG. 6 is a schematic plan view of the fitting with torsion box according to an embodiment of the invention along the section A-A of FIG. 4, showing an additional laminate which copies the shape of the end element.

Moreover, as can be seen in FIG. 6, the fitting 30 may comprise an additional laminate 6 which may be arranged on top of the end elements 5a, 5b, each laminate 6 having an omega-shaped cross section similar to that of said elements, forming a single piece with the latter.

The walls 2a, 2b of the fitting according to the invention could be joined to the skin of the tail fuselage 1 by means of additional parts. Likewise, the fitting configuration could comprise moreover an upper section or wall so that the side walls 2a and 2b are joined together by means of said upper section 2c, thus constituting a single U-shaped integrated part which allows the side walls 2a, 2b to be joined directly to the skin of the tail fuselage 1, by means of the said upper section 2c, without the need for additional parts, so that the behaviour of the fitting according to the invention in response to lateral loads is much more advantageous, since the fitting, owing to the direct joint with the skin and the central element with the I-shaped cross section, has a more rigid configuration in response to the external load stresses.

Thus the fitting according to the invention has the following advantages compared to the known fittings:

the fitting is easier to manufacture, fundamentally as regards the central element 4a, 4b, 4c since, owing to the end elements 5a and 5b being situated on the outer face of the side walls 2a and 2b, the central element 4 have an I-shaped cross section;

said I-shaped cross section, in addition to the easier manufacturing, has the effect that the fitting is more rigid in response to side loads or loads in the vertical direction which try to close the walls 2a and 2b, the fitting having a better structural behaviour in response to said stresses; moreover, when the fitting is joined directly by means of the upper section 2c to the skin of the tail fuselage 1, without the need of additional parts, the behaviour of the fitting according to the invention is much better than in the known solutions.

The embodiments described above could be subject to those modifications which are included within the scope defined by the following claims.

The invention claimed is:

1. A fitting made of composite material for trimming a horizontal stabilizer of an aircraft with respect to a tail fuselage of the aircraft, wherein the fitting includes side walls of a torsion box as well as joining units which join the fitting to the frames of the tail fuselage of the aircraft, said side walls being joined together by a central element which includes a first end part joined to a first side wall of the fitting, a second end part joined to a second side wall of the fitting, and a central part which joins together said end parts, the fitting includes end elements which are joined to said side walls on their outer face, said fitting having, owing to its greater rigidity in response to side load and vertical load stresses which try to close the side walls, its greater integration and the simplicity of the load path, an optimum structural behaviour in response to the aircraft loads.

2. The fitting according to claim 1, wherein the side walls of the fitting are joined together by an upper section constituting a single U-shaped integrated part which allows the side walls to be joined directly, without the need of additional parts, to a skin of the tail fuselage of the aircraft by the upper section, improving moreover the behaviour of the fitting in response to the side load since the U-shaped cross section provides a better support for the side walls of the fitting.

3. The fitting according to claim 1, wherein each side wall has, on each side of the central element, zones intended to prevent buckling of the side walls.

4. The fitting according to claim 1, wherein the end elements have an overall cross section in the form of an omega.

5. The fitting according to claim 1, further comprising an additional laminate which copies the geometrical form of the said end elements is added to the end elements, forming a single piece with the end elements, so that possible problems of separation of the end elements and the side walls are avoided.

6. The fitting according to claim 5, wherein the additional laminate is made of composite material.

7. The fitting according to claim 1, further comprising a primary fastening which includes in turn through-holes which are aligned and respectively located in primary lugs.

8. The fitting according to claim 7, wherein the through-holes are arranged in reinforced zones of the end elements, and the through-holes being arranged in reinforced zones of the side walls.

9. The fitting according to claim 8, wherein the reinforced zones of the end elements and the side walls are zones of greater thickness.

10. The fitting according to claim 8, wherein the reinforced zones of the end elements and the side walls are zones provided with a hybrid titanium-CFRP laminate.

11. The fitting according to claim 1, further comprising a secondary fastening which in turn comprises through-holes situated in the central element.

12. The fitting according to claim 11, wherein the secondary fastening of the fitting is reinforced with a hybrid titanium-CFRP laminate.

13. The fitting according to claim 11, wherein the secondary fastening of the fitting is a zone of greater thickness.

* * * * *